3,071,613
Patented Jan. 1, 1963

3,071,613
N-(2,2-DIALKOXYETHYL)-(HALOGENATED-PHENYL) ALKYLAMINES
Alexander R. Surrey, Albany, N.Y., assignor to Sterling Drug Inc., New York, N.Y., a corporation of Delaware
No Drawing. Original application July 3, 1957, Ser. No. 669,710, now Patent No. 2,929,844, dated Mar. 22, 1960. Divided and this application Feb. 27, 1959, Ser. No. 822,406
7 Claims. (Cl. 260—501)

This invention relates to novel N-(2,2-dialkoxyethyl)-(substituted-phenyl)alkylamines useful for example as intermediates in the preparation of some of the compounds of my copending application Serial No. 669,710, filed July 3, 1957, of which this application is a division.

The N-(2,2-dialkoxyethyl - N - [(substituted-phenyl)-alkyl]dihaloacetamides which are disclosed and claimed in my copending application Serial No. 669,710, now U.S. Patent 2,929,844, issued March 22, 1960, have the general Formula I

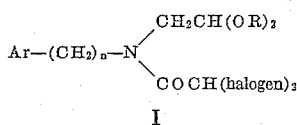

I where Ar is a phenyl radical substituted by from one to three radicals selected from the group consisting of halogen, lower-alkoxy and lower-alkyl, $n$ is an integer from 1 to 2 inclusive and R is a lower-alkyl radical.

In the above Formula I the substituents of the phenyl radical designated as Ar can be in any of the five available positions of the phenyl nucleus, and where more than one, can be the same or different and can be in any of the various position combinations relative to each other. The halo substituents include chloro, bromo, iodo and fluoro. The lower-alkoxy and lower-alkyl substituents have preferably one to six carbon atoms, illustrated by methoxy, ethoxy, n-propoxy, isopropoxy, n-butoxy, isobutoxy, n-pentoxy, n-hexoxy and the like for lower-alkoxy; and methyl, ethyl, n-propyl, isopropyl, n-butyl, isobutyl, n-pentyl, n-hexyl and the like for lower-alkyl.

The lower-alkyl radicals of the above general Formula I, designated as R, has preferably from one to six carbon atoms and includes methyl, ethyl, n-propyl, isopropyl, n-butyl, isobutyl, n-pentyl, n-hexyl and the like, particularly preferred embodiments being methyl and ethyl.

The halogen atoms of the dihaloacetyl radicals of my compounds, designated in the above Formula I as —COCH(halogen)$_2$, can be chloro, bromo, iodo or fluoro, these dihaloacetyl radicals including dichloroacetyl, dibromoacetyl, diiodoacetyl, difluoroacetyl, bromochloroacetyl, bromoiodoacetyl, chloroiodoacetyl, and the like.

The compounds of Formula I were prepared by reacting an N-(2,2-dialkoxyethyl)-(substituted-phenyl)alkylamine of the formula, Ar—(CH$_2$)$_n$—NHCH$_2$CH(OR)$_2$, where Ar, $n$ and R have the meanings given above, with a dihaloacetyl halide.

The N-(2,2-dialkoxyethyl)-(substituted - phenyl)alkylamines were prepared by reacting the corresponding (substituted-phenyl)alkylamine of the formula Ar—(CH$_2$)$_n$—NH$_2$ with a di-(lower-alkyl)-acetal of a haloacetaldehyde of the formula (halogen)—CH$_2$CH(OR)$_2$.

The chemical structures of the compounds of my invention are established by their mode of synthesis and corroborated by the correspondence of calculated and found values for elementary analyses for representative examples.

My instant invention resides in certain of the intermediate N-(2,2-dialkoxyethyl)-(substituted-phenyl)alkylamines, specifically, the N-(2,2,-dialkoxyethyl)-(halogenated-phenyl)alkylamines having in free base form the following Formula II

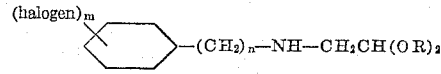

II where $m$ is an integer from 1 to 3 inclusive, $n$ is an integer from 1 to 2 inclusive and R is a lower-alkyl radical. My invention comprehends not only these N-(2,2-dialkoxyethyl)-(halogenated-phenyl)alkylamines in their free base form, but also their acid-addition salts. These N-(2,2-dialkoxyethyl)-(halogenated-phenyl)alkylamines, in addition to being intermediates for the preparation of compounds of Formula I, have the additional and unusual utility, not found in the entire group of intermediates, in having anthelmintic activity.

My N-(2,2-dialkoxyethyl)-(halogenated-phenyl)alkylamines are useful in the free base form or in the form of acid-addition salts, and both forms are within the purview of the invention. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial physiological properties inherent in the free base are not vitiated by side effects ascribable to the anions; in other words, the latter do not substantially affect the pharmacodynamic properties inherent in the cations. In practicing my invention, I found it convenient to employ the hydrochloride salt. However, other appropriate pharmacodynamically acceptable salts within the scope of the invention are those derived from mineral acids such as hydrobromic acid, hydriodic acid, nitric acid, phosphoric acid, and sulfuric acid; and organic acids such as acetic acid, citric acid, tartaric acid, lactic acid, ethanesulfonic acid, quinic acid, and the like, giving the hydrobromide, hydriodide, nitrate, phosphate, sulfate, acetate, citrate, tartrate, lactate, ethanesulfonate and quinate, respectively.

The acid-addition salts are prepared either by dissolving the free base in aqueous solution containing the appropriate acid and isolating the salt by evaporating the solution, or by reacting the free base and acid in an organic solvent, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacodynamically acceptable salt by ion exchange procedures.

The above-described N-(2,2-dialkoxyethyl)-(halogenated-phenyl)alkylamines have valuable chemotherapeutic properties, in particular, anthelmintic activity as determined in Swiss mice by standard procedures.

The following examples will further illustrate the invention without, however, limiting it thereto.

EXAMPLE 1

*N-(2,2-Dialkoxyethyl)-(Substituted-Phenyl)alkylamines*

The preparation of these compounds is illustrated by the following preparation of N-(2,2-diethoxyethyl)-2,4-dichlorobenzylamine: A mixture of 80 g. of 2,4-dichlorobenzylamine and 30.5 g. of chloroacetaldehyde diethylacetal was heated on a steam bath with stirring for about fifty-four hours. An equal volume of ether was added and the solid which separated (42 g. of 2,4-dichlorobenzylamine hydrochloride) was filtered off. The ether was removed from the filtrate by distillation in vacuo and the residual material was distilled under reduced pressure. There was thus obtained 23.5 g. of N-(2,2-diethoxyethyl)-2,4-dichlorobenzylamine distilling at 124–132° C. at 0.5 mm.; $n_D^{25}$=1.5160.

*Anal.*—Calcd. for $C_{13}H_{19}Cl_2NO_2$: Cl, 24.24. Found: Cl, 25.13, 25.08.

Treatment of N-(2,2-diethoxyethyl)-2,4-dichlorobenzylamine with an acid, e.g., HCl, results in the formation of the corresponding acid-addition salt, e.g., hydrochloride.

Other N-(2,2-dialkoxyethyl)-(substituted-phenyl)alkylamines that were prepared following the procedure described for the preparation of N-(2,2-diethoxyethyl)-2,4-dichlorobenzylamine using the appropriate reactants are given in Table A.

TABLE A

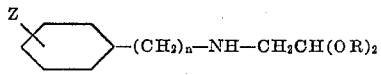

| No. | Z | n | R | Percent Yield | B.P., ° C., at mm. Hg | $n_D^{25}$ |
|---|---|---|---|---|---|---|
| 1 | 4-OC₄H₉-n | 1 | C₂H₅ | | 146 at 2.5 | 1.5090 |
| 2 | 4-C₃H₇-i | 1 | C₂H₅ | 60 | 102–103 at 0.25 | 1.4872 |
| 3 | 4-Cl | 2 | C₂H₅ | 69 | 101–105 at 0.17 | 1.4998 |
| 4 | 2-Cl | 1 | C₂H₅ | 65 | 96–102 at 0.2 | 1.5078 |
| 5 | 4-Cl | 1 | C₂H₅ | 74 | 99–103 at 0.15 | 1.5039 |
| 6 | 4-C₃H₇-i | 1 | CH₃ | 48 | 97 at 0.15 | 1.4955 |
| 7 | 4-Cl | 1 | CH₃ | 57 | 93–97 at 0.12 | 1.5130 |
| 8 | 2,4-Cl₂ | 1 | CH₃ | 59 | 98–106 at 0.12 | 1.5230 |

Elemental analyses of the compounds of Table A are given in Table B.

TABLE B

| No. | N Calcd. | N Found |
|---|---|---|
| 1 | (a) | (a) |
| 2 | 5.28 | 5.31 |
| 3 | 5.15 | 5.12 |
| 4 | 5.45 | 5.56 |
| 5 | 5.43 | 5.62 |
| 6 | 5.90 | 5.87 |
| 7 | 6.10 | 6.14 |
| 8 | 5.30 | 5.42 |

(a) Calcd.: C, 69.11; H, 9.89. Found: C, 71.47; H, 9.38.

Other N-(2,2-dialkoxyethyl)-(substituted-phenyl)alkylamines that can be prepared according to the above procedure using equivalent quantities of the appropriate reactants include the following: N-(2,2-di-n-propoxyethyl)-2,4-dibromobenzylamine using 2,4-dibromobenzylamine and chloroacetaldehyde di-n-propylacetal; N-(2,2-diisobutoxyethyl)-3-iodobenzylamine using 3-iodobenzylamine and chloroacetaldehyde diisobutylacetal; N-(2,2-di-n-hexoxyethyl)-2-(3,4,5-trimethoxyphenyl)ethylamine using 2-(3,4,5-trimethoxyphenyl)ethylamine and chloroacetaldehyde di-n-hexylacetal; N-(2,2-diethoxyethyl)-3-isopropylbenzylamine using 3-isopropylbenzylamine and chloroacetaldehyde diethylacetal; N-(2,2-diethoxyethyl)-4-fluorobenzylamine using 4-fluorobenzylamine and chloroacetaldehyde diethylacetal; N-(2,2-diethoxyethyl)-2,4,6-trichlorobenzylamine using 2,4,6-trichlorobenzylamine and chloroacetaldehyde diethylacetal; N-(2,2-dimethoxyethyl)-2-(3-methoxy-4-isopropylphenyl)ethylamine using 2-(3-methoxy-4-isopropylphenyl)ethylamine and chloroacetaldehyde dimethylacetal; N-(2,2-diethoxyethyl)-2-n-propoxy-4-chlorobenzylamine using 2-n-propoxy-4-chlorobenzylamine and chloroacetaldehyde diethylacetal; N-(2,2-diethoxyethyl)-4-n-butoxybenzylamine using 4-n-butoxybenzylamine and chloroacetaldehyde diethylacetal; N-(2,2-diethoxyethyl)-4-n-hexoxybenzylamine using 4-n-hexoxybenzylamine and chloroacetaldehyde diethylacetal; N-(2,2-diethoxyethyl)-2,4,6-trimethylbenzylamine using 2,4,6-trimethylbenzylamine and chloroacetaldehyde diethylacetal; N-(2,2-diethoxyethyl)-4-n-hexylbenzylamine using 4-n-hexylbenzylamine and chloroacetaldehyde diethylacetal; and the like.

The N-(2,2-dialkoxyethyl)-(substituted-phenyl)alkylamines can be isolated as their free bases or in the form of their acid-addition salts, e.g., hydrochlorides. The following preparation illustrates the formation and isolation of one of these compounds as its salt.

A mixture of 7.5 g. of 3,4-dichlorobenzylamine and 30.5 g. of chloroacetaldehyde diethylacetal was heated on a steam bath with stirring for about seven hours. An equal volume of ether was added and the solid which separated was filtered off. The ether was removed from the filtrate by distillation in vacuo and the residual material was distilled under reduced pressure. There was thus obtained 21 g. (36% yield) of N-(2,2-diethoxyethyl)-3,4-dichlorobenzylamine, distilling at 116–120° C. at 0.10 mm., $n_D^{22}$=1.5120.

*Anal.*—Calcd. for $C_{13}H_{19}Cl_2NO_2$: N, 4.79. Found: N, 4.66.

To 5 g. of N-(2,2-diethoxyethyl)-3,4-dichlorobenzylamine in free base form was added 2.6 ml. of 6.5 N ethanolic hydrogen chloride in ether. The solid that separated was collected and washed well with ether. There was thus obtained 3.0 g. of N-(2,2-diethoxyethyl)-3,4-dichlorobenzylamine hydrochloride, M.P. 135.8–137.0° C. (corr.).

*Anal.*—Calcd. for $C_{13}H_{19}Cl_2NO_2 \cdot HCl$: Cl⁻, 10.77; C, 47.51; H, 6.13. Found: Cl⁻, 10.92; C, 46.94; H, 6.08.

My N-(2,2-dialkoxyethyl)-halogenated-benzylamines Formula III when administered orally to Swiss mice infected with *Hymenolepis nana* were found to clear half of the animals at doses of about 500 mg. per kg. per twelve hours for a period of four days, e.g., N-(2,2-diethoxyethyl)-3,4-dichlorobenzylamine as its monohydrochloride was found to clear 40% of the animals at a dose level of 400 mg. per kg. My N-(2,2-dialkoxyethyl)-halogenated-benzylamines can be formulated in the same manner as conventional anthelmintics such as piperazine or hexylresorcinol preparations.

I claim:

1. A compound selected from the group consisting of a compound having the formula

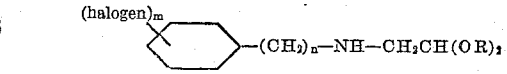

where *m* is an integer from 1 to 3 inclusive, *n* is an integer from 1 to 2 inclusive, R is a lower-alkyl radical and acid-addition salts thereof.

2. A compound having the formula

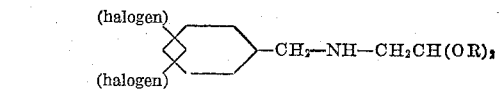

where R is a lower-alkyl radical.

3. An acid-addition salt of the compound of claim 2.

4. A compound having the formula

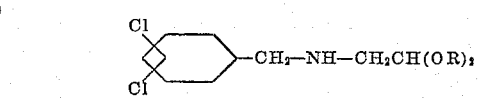

where R is a lower-alkyl radical.

5. N-(2,2-diethoxyethyl)-2,4-dichlorobenzylamine.
6. N-(2,2-diethoxyethyl)-3,4-dichlorobenzylamine.
7. N-(2,2-diethoxyethyl)-3,4-dichlorobenzylamine hydrochloride.

References Cited in the file of this patent

UNITED STATES PATENTS

| | | |
|---|---|---|
| 1,949,247 | Eisleh | Feb. 27, 1934 |
| 2,683,719 | Kerwin et al. | July 13, 1954 |
| 2,683,744 | Kerwin et al. | July 13, 1954 |
| 2,929,844 | Surrey | Mar. 22, 1960 |

OTHER REFERENCES

Frank et al.: Canadian Jour. of Chem., vol. 33, pages 365 to 374 (1955).

Rugheimer et al.: Berichte, vol. 41, pages 17 and 18 (1908). (Available in Sci. Lib., Pat. Off., Wash., D.C.)